: US009440883B1

United States Patent
Brien

(10) Patent No.: US 9,440,883 B1
(45) Date of Patent: Sep. 13, 2016

(54) SPALL-RESISTANT CEMENTITIOUS MATERIAL

(71) Applicant: Joshua V. Brien, Mayfield, KY (US)

(72) Inventor: Joshua V. Brien, Mayfield, KY (US)

( * ) Notice: Subject to any disclaimer, the term of this patent is extended or adjusted under 35 U.S.C. 154(b) by 0 days.

(21) Appl. No.: 14/871,122

(22) Filed: Sep. 30, 2015

Related U.S. Application Data

(63) Continuation of application No. 13/832,198, filed on Mar. 15, 2013, now abandoned.

(60) Provisional application No. 61/702,404, filed on Sep. 18, 2012.

(51) Int. Cl.
    C04B 24/24      (2006.01)
    C04B 26/04      (2006.01)
    F41H 5/02       (2006.01)

(52) U.S. Cl.
    CPC ............. *C04B 26/045* (2013.01); *F41H 5/023* (2013.01)

(58) Field of Classification Search
    CPC ........................... C04B 26/045; F41H 5/023
    See application file for complete search history.

(56) References Cited

U.S. PATENT DOCUMENTS

| | | | |
|---|---|---|---|
| 6,230,804 B1 | 5/2001 | Mueller et al. | |
| 8,017,672 B2 | 9/2011 | DeFord et al. | |
| 8,598,093 B2 | 12/2013 | Roddy et al. | |
| 2004/0204516 A1* | 10/2004 | DeFord .................. | C04B 28/04 524/2 |

OTHER PUBLICATIONS

Afridi, M., Chaudhary, Z., Ohama, Y., Demura, K., 1994, Effects of polymer modification on the formation of high sulphoaluminate or ettringite type (Aft) crystals in polymer modified mortars, Cement and Concrete Research, vol. 24, No. 8, 1492-1494, Jan. 1, 1994.

Afridi, M., Chaudhary, Z., Ohama, Y., Katsunori, D., 1994, Strength and Elastic Properties of Powdered and Aqueous Polymer-Modified Mortars, Cement and Concrete Research, vol. 24, No. 7, pp. 1199-1213, Jan. 1, 1994.

Afridi, M., Ohama, Y., Demura, K., Izbal, M.Z., 2003, Development of polymer films by the coalescence of polymer particles in powdered and aqueous polymer-modified mortars, Cement and Concrete Research, 33 (2003) 1715-1721 Jan. 1, 2003.

Cargile, J.D., Oneil, E.F., Neeley, B.D., 2002, Very High Strength Concretes for Use in Blast and Penetration Resistant Structures, US Army Corps of Engineers Engineer Research and Development Center, AMPTIAC Quarterly vol. 6, No. 4, pp. 61-67 Jan. 1, 2002.

Carpinteri, A., Cornetti, P., Barpi, F., Valente, S., 2003, Cohesive crack model description of ductile to brittle size scale transition: dimensional analysis vs. renormalization group theory, Engineering Fracture Mechanics 70 1809-1839 Feb. 7, 2003.

(Continued)

*Primary Examiner* — John Uselding

(57) ABSTRACT

Disclosed is a cementitious product, the product comprising a liquid medium, a hydraulic binding agent, a latex polymer and optionally one or more other components, wherein the direct tensile strength of the product as determined by ASTM C307 is at least 120% of a predicted direct tensile strength of the product per an equation selected from the group consisting of $f'dt=0.06*f'c$, $f'dt=0.07*f'c$, $f'dt=0.08*f'c$ and $f'dt=0.11*f'c$, and wherein the the flexural strength of the product as determined by ASTM C348 is at least 150% of a predicted flexural strength of the product per an equation selected from the group consisting of $f'r=0.1*f'c$, $f'r=0.17*f'c$, $f'r=9.5*((f'c)^0.5)$ and $f'r=7.5*((f'c)^0.5)$.

18 Claims, 16 Drawing Sheets

(56) References Cited

OTHER PUBLICATIONS

Glasser, F.P. et al, "High-Performance Cement Matrices Based on Calcium Sulfoaluminate-Belite Compositions," Cement and Concrete Research 31, (2001) 1881-1886. Jan. 1, 2001.
Graybeal, B., 2010, Behavior of Field Cast Ultra High Performance Concrete Bridge Deck Connections Under Cyclic and Static Structural Loading, Nov. 2010, FHWA-HRT-11-023 Nov. 1, 2010.
Graybeal, B., 2010, FHWA-HRT-11-022, Field Cast UHPC Connections for Modular Bridge Deck Components, Nov. 2010, FHWA-HRT-11-022 Nov. 1, 2010.
Graybeal, B., 2009, FHWA-HRT-09-069, Structural Behavior of a 2nd Generation UHPC Pi-Girder, FHWA-HRT-09-069 Oct. 1, 2009.
Graybeal, B., 2006, FHWA-HRT-06-103, Material Property Characterization of Ultra High Performance Concrete, Aug. 1, 2006.
Jenni, A., Herwegh, M., Zurbriggen, R., Aberle, T. and Holzer, L., 2003 Quantitative micro-structure analysis of polymer modified mortars, Jounal of Microscopy, vol. 212, pp. 186-196 Jan. 1, 2003.
Juenger, M.C.G. et al, "Advances in Alternative Cementitious Binders," Cement and Concrete Research 41 1232-1243. Jan. 1, 2011.
Kalman, D., 2010, Use of Steel Fiber Reinforced Concret for Blast Resistant Design, Thesis, Department of Architectural Engineering and Construction Science, Kansas State University Jan. 1, 2010.
Marraccoli, M., et al., 2007, Synthesis of Calcium Sulfoaluminate Cements from Blends of Coal Combustion Ashes with Flue Gas Desulfurization Gypsum, Processes and Technologies for a Sustainable Energy, Ischia, Jun. 27-30, 2010.
McCann, D. M., & Smith, S. J., 2007, Blast Resistant Design of Reinforced Concrete Structures. Structure Magazine , pp. 22-26. Apr. 1, 2007.
Medeiros, M.H.F., Helene, P., Selmo, S., 2009, Influence of EVA and acrylate polymers on some mechanical properties of cementitious repair mortars, Construction and Building Materials 23 2527-2533 Mar. 21, 2009.
Mindness, S., 1977, The J-Integral as a Fracture Criterion for Fiber Reinforced Concrete, Cement and Concrete Research vol. 7, pp. 731-742, Sep. 15, 1977.
Oneil, E.F., et al., Development of Very High Strength and High Performance Concrete Materials for Improvement of Barriers Against Blast and Projectile Penetration, US Army Corps of Engineers, US Army Engineer Research and Development Center Jan. 1, 2004.
Pelletier, L., Winnefeld, F., Lothenbach, B., 2010, The ternary system: Portland cement-calcium sulphoaluminate clinker-anhydrite: Hydration mechanism and mortar properties, Cement and Concrete Composites 32 497-507 Jan. 1, 2010.
Renaudin, G., Segni, R., Mentel, D., Nedelec, J., Leroux, F., Taviot-Gueho, C., 2007, A Raman Study of the Sulfated Cement Hydrates: Ettringite and Monosulfoaluminate, Journal of Advanced Concrete Technology, vol. 5, No. 3, 299-312, Sep. 16, 2007.
Rossi, P. et al, "Comparison between Plain Concrete Toughness and Steel Fibre Reinforced Concrete Toughness," Cement and Concrete Research, vol. 16, 1986, 303-313. Jan. 1, 1986.
Routh, A., Russel, W., 1999, A process model for latex film formation: limiting regimes for individual driving forces, Department of Chemical Engineering, Princeton University, Langmuir, 15 7762-7773 Jun. 29, 1999.
Sakai et al, "Composite Mechanism of Polymer Modified Cement," Cement and Concrete Research 25, No. 1, 1995, pp. 127-135. Oct. 21, 1994.
Schulze, Joachim, "Influence of water-cement ratio and cement content on the properties of polymer-modified mortars," Cement and Concrete Research 29 909-915. Mar. 2, 1999.
Sprinkel, M., 2002, Rapid Bridge Deck Rehabilitation Manual, SHRP Product 2035A, AASHTO Innovative Highway Technologies Aug. 1, 1993.
Vande Voort, T., Suleiman, M., Sritharan, S., 2008, Design and Performance Verification of Ultra-High Performance Concrete Piles for Deep Foundations, Iowa Highway Research Board, Iowa Department of Transportation, IHRB Project TR-558 Nov. 1, 2008.
Van Gemert et al, "Cement Concrete and Concrete-Polymer Composites: two merging worlds," 11th IPIC Congress in Berlin, Jan. 1, 2004.
Walters, D. Gerry, "Comparison of Latex-Modified Portland Cement Mortars," ACI Materials Journal, Jul.-Aug. 1990, 371-377. Jul. 1, 1990.
Zampini, D. et al, "Characterization of the paste-aggregate interfacial transition zone surface roughness and its relationship to the fracture toughness of concrete," Journals of Materials Science 30 3149-3154. Jan. 1, 1995.
Zhang, X., Xu., S., 2011, A comparative study on five approaches to evaluate double K fracture toughness parameters of concrete and size effect analysis, Engineering Fracture Mechanics 78 2115-2138 Jan. 1, 2011.
Zhang, X. et al, "Estimation of Fracture Toughness, driving force, and fracture energy for fractal cracks using the method of imaginary smooth crack," Engineering Fracture Mechanics 77 (2010), pp. 621-630. Dec. 21, 2009.
International Search Report and Written Opinion for PCT/US2013/031832 dated Dec. 17, 2013.
Forrestal et al., "An empirical equation for penetration depth of ogive-nose projectiles into concrete targets"; International Journal of Impact Engineering, 1994, vol. 15, Issue 4, pp. 395-405; Aug. 27, 1993.
Domone et al., "Construction Materials: Their Nature and Behaviour"; 4th Ed., London and Newyork: Spon Press, 2010, ISBN 0-203-92757-5; pp. 170, 172-174; Jan. 1, 2010.

* cited by examiner

SPALL-RESISTANT CEMENTITIOUS MATERIAL

CROSS-REFERENCE TO RELATED APPLICATIONS

This application is a continuation of U.S. patent application Ser. No. 13/832,198, filed Mar. 15, 2013, which application claims priority to and benefit under 35 U.S.C. §119(e) to U.S. Provisional Patent Application Ser. No. 61/702,404, filed on Sep. 18, 2012, in the name of the present inventor, this provisional application being incorporated herein by reference.

FIELD OF THE INVENTION

The field relates to a cementitious material that possesses favorable toughness and resists spalling.

BACKGROUND OF THE INVENTION

There is a long-felt need for a cementitious material having sufficient strength while also possessing favorable toughness. Typically, overall strength decreases, with one example being compressive strength, while toughness increases. Strength is defined as force per unit area, i.e. energy per unit volume, while toughness is energy per unit area.

The toughness index, as evaluated by the area under the load-deflection curve, is considered as a measure of the energy absorption capability of the material during fracture in the non-linear portion of the curve. The ACI Committee 544 (83-85) has defined the toughness index as the measure of the amount of energy required to deflect a fiber concrete beam, used in the modulus of rupture test, by a given amount compared to the energy required to bring the fiber beam to the point of first crack.

In ductile materials, with one example being metals, the fracture process zone, though small, is surrounded by a large nonlinear plastic zone, whereas in quasi-brittle materials, with an example being concrete, the fracture process zone occupies practically the entire zone of nonlinear deformation. In contrast, the nonlinear zone is practically absent in brittle materials.

When creating cementitious materials for ballistic or blast applications, two very important design considerations are meeting the specified mechanical strength requirements and minimizing the amount of spall at failure. One traditional means for designing hydraulic cement based materials to meet such performance requirements is to densify the material's microstructure while incorporating some means of reinforcement. Commonly used reinforcing materials are often fibrous materials—likely steel fibers. Steel fibers are primarily responsible for increases in ductility for cementitious materials possessing dense microstructures. In most densified cementitious materials, the coarse aggregate in mix designs is substituted with finely ground fillers in conjunction with high performing water reducers to create a very dense microstructure possessing fewer capillary networks ultimately leading to a somewhat ideal "spacing packing" design for much better distribution of applied load. This methodology is also referred to as the "packing density optimization principle" and such materials may also be referred to as "densified spacing packing" (DSP) materials. A few common examples of finely ground fillers are ground quartz, silica fume, fly ash and ground granulated blast furnace slag. Typically these fine materials are of smaller particle size when compared with un-hydrated cement grains allowing the finely ground fillers to occupy spaces between cement grains providing homogeneity throughout the microstructure for better, more consistent distribution of applied loads. These dense materials often possess incredible compressive strengths, though the tensile strength often remains in the realm of 10% of compressive strength. As previously mentioned, fiber addition often improves tensile strength. Materials falling into this dense microstructure classification with incredibly high compressive strength values are often referred to as ultra high performing concrete (UHPC) or very high performing concrete (VHPC). The densified spacing packing "DSP" based cementitious materials are however distinctly brittle, the more so the higher the compressive strength. In fact, although the tensile strength is about one tenth of the compressive strength, the material is intrinsically brittle. Therefore, a process such as is described herein can be incorporated into mix designs for DSP based materials for mitigating spall in blast or ballistic applications.

A material such as is described herein embodies a completely different approach for meeting the specified mechanical strength requirements for ballistic or blast applications while minimizing the amount of spall at failure. A material such as is described herein includes latex polymers in cementitious materials mix designs. As opposed to the "densification of microstructure" methodology, the microstructures of polymer modified cementitious materials become less dense with increases in polymer content due to tough, flexible polymer films occupying the void spaces within the microstructure. The microstructural behavior of polymer modified materials changes with increases in polymer concentration. Low polymer concentrations create very tough materials which fail in somewhat brittle fashion; whereas, high polymer concentrations create somewhat flexible materials which fail in elastic fashion. Essentially, polymer concentration influences the material's modulus of elasticity. Higher concentrations of polymer per specific volume of microstructure decrease the modulus of elasticity thereby forming a more ductile material.

These polymers are film forming thermoplastic materials widely known for use as mechanical property modifiers for specialty cementitious products. These film forming polymers are known to increase direct tensile strength of mortars by filling void spaces with tough, flexible polymer film. These film-forming polymers are known to increase adhesion strength to materials by forming mechanical bonds with the substrate. For example, polymer modified mortars with higher polymer/cement ratio demonstrate acceptable adhesion performance to non-porous substrates, with an example being glass. Such improvements in both adhesion characteristics and ductile behavior highlight a material such as is described herein as ideal for use in applications requiring coating of other construction materials for mitigating spall during failure of said materials.

In contrast to the mechanical property correlations inherent to traditional cementitious materials, polymer modified cementitious materials possess significantly higher direct tensile strengths and flexural strengths (modulus of rupture). In polymer modified cementitious materials, both direct tensile strength and flexural strength increase to some optimum value before beginning a decreasing trend with increases in polymer/cement ratio. Compressive strengths of polymer modified cementitious materials are often lower than compressive strength of traditional cementitious materials due to the presence of tough, flexible polymer film within the pore network of the polymer modified cementitious materials. The polymer alone behaves as a rubber like material which correlates to decreases in compressive strength with increases in polymer dosage. Such behavior of polymeric material has the potential to lead to creep type behavior for select mix designs. Depending upon area of application, mitigating creep behavior should not be limited to methods such as selecting interlocking aggregates or adding mesh type reinforcing materials, not limited to mesh materials containing fabrics, yarns, wires or nano-tubes.

The mechanical property performance of polymer modified cementitious materials can be strictly controlled by varying the polymer/cement ratio. In other words, the ductile behavior of polymer modified cementitious materials can be strictly controlled by adjusting the polymer/cement ratio. The mechanical property performance of polymer modified cementitious materials can also be influenced by both polymer chemistry and polymer glass transition temperature (Tg); however, the polymer/cement ratio is always to be taken into account when making a material such as is described herein.

In latex polymer modified cementitious materials, the polymer is dispersed somewhat uniformly throughout the material microstructure. Increasing the polymer/cement ratio increases the amount of polymer per given volume of material. The polymer is a tough, flexible material. As the polymer/cement ratio increases, the amount of tough, flexible material increases allowing a transition from brittle to ductile behavior with increasing polymer/cement ratio. As previously mentioned, both direct tensile strength and flexural strength increase up to an optimum value before beginning a gradual decrease with increasing polymer/cement ratio. Even though compressive strength, tensile strength and flexural strength begin to decrease with increasing polymer/cement ratio, all is not lost in terms of material behavior as the percent elongation at break for uniaxial direct tensile testing continually increases with increases in polymer/hydraulic binding agent ratio excluding influence of other reinforcing materials with examples not being limited to fibers, rebar and mesh. Such behavior highlights a material such as is described herein as ideal for mitigating spall in specific applications.

High polymer/cement ratio cementitious materials exhibit extraordinary behavior when compared with traditional, brittle cementitious materials. High polymer/cement ratio cementitious materials will display a yield curve on a stress/strain diagram likely with greater area under the curve when compared with traditional cementitious materials. High polymer/cement ratio materials often display a longer plateau for the yield curve as the material fails and the platens of the testing machine move a greater distance during failure when compared with materials more brittle in nature. Such a longer plateau and greater area under the stress/strain curve highlight the increased toughness of these high polymer/cement ratio materials. Aforementioned behavior, akin to that of greater elongation at break during uni-axial direct tensile strength testing of a material such as is described herein, creates a set of circumstances such that a material such as is described herein can incorporate various materials, which previous reports create the common perception of it being well known said materials are less effective when incorporated with cementitious materials versus incorporation with materials more elastic in behavior. An example of such material should not be limited to aramid yarn spun in the form of Kevlar fabric. It is well known to those skilled in the art that Kevlar K29 mesh is commonly used as the workhorse in soft armor or soft ballistic materials. Kevlar K29 is ideal for use in soft armor as K29 may elongate some 3% or more before failure. When constrained, it is believed a certain number of layers of K29 are less effective when compared with an identical number of layers of K29 allowed room for elongation when subject to loading. The increased ductile behavior of higher polymer/cement ratio cementitious materials creates an environment conducive for incorporation of high performance, engineered type materials into design of materials resulting from a process such as is described herein. Additionally, a material such as is described herein may serve as a suitable material for incorporation of recycled materials, not being limited to recycled aramid type materials.

When subjected to sudden high velocity impact or blast loading, the amount of generated spall decreases significantly with increasing polymer/cement ratio. The continuous polymer film throughout the material microstructure binds the constituent materials together. The tough, flexible polymer film bridges micro-cracks as they form, thus increasing the material's capacity for energy absorption. This adequately explains the observed results for reduced cracking and spall for the tested materials with increases in polymer/cement ratio. A material such as is described herein is seen as a suitable low cost alternative material for inclusion during manufacture of Chobham type armor components, or any armor type components, whether they be used for construction of personal defense devices or armoring of vehicles, components, structures, vessels, crafts or other tangible objects.

Given the ability of a material such as is described herein to absorb more energy during crack formation processes, such microstructural behavior creates ideal circumstances for incorporation of specifically designed objects, with examples not being limited to items comprising wood, glass, ballistic glass, plexi-glass, safety glass, thermoset polymer based materials, thermoplastic polymer based materials, composites, polymer composites, ceramic type materials, ceramic tiles, tiles produced from any material or combination or materials, ball bearings, metals, alloys, boron carbide, silicon carbide, aluminum oxide, aluminum nitride, titanium boride, or the like for purposes of either absorbing energy of projectiles or altering the path of the projectile, thereby increasing the total distance the projectile must travel before nearing a surface and creating spall as the projectile progresses some distance through the microstructure of the host material. Behavior of such materials is deemed as ideal for meeting the need for cheaper construction materials for the purpose of providing a specified degree of protection for persons or property subject to ballistic or blast loading. Such construction materials can be used to form virtually any conceivable object or geometry, either load bearing or non-load bearing, either as a sole material or in combination with other construction materials and methods of construction.

Various methods exist for classifying behavior of materials subject to blast or ballistic type loading. Common test methods or schemes for ballistic type loading should not be limited to Underwriters Laboratories UL 752, National Institute of Justice NIJ 018.01, United States State Department SD-SDT-02.01, ASTM F-1233, European Normal Standard DIN EN 1063 or HP White Laboratories HPW-TP 0500.02. A listing of requirements set forth when testing according to UL 752 is discussed in reference with Table 9 of this document. Examples of a material such as is described herein tested according to UL752 were tested at a distance of approximately 10 ft or approximately 3.05 m from the sample.

Numerous reports exist describing a need for development of higher performing cementitious materials which will maintain greater degrees of structural integrity with reduced potential for releasing fragmented projectiles when exposed to either blast or ballistic type forces. A material such as is described herein accordingly provides higher-performing cementitious materials which will maintain a greater degrees of structural integrity with reduced potential for releasing fragmented projectiles when exposed to either blast or ballistic type forces.

SUMMARY OF THE INVENTION

A material such as is described herein provides inter alia an optionally load-bearing essentially shaped cementitious product manufactured by steps comprising:

(a) admixing a liquid medium, a hydraulic binding agent, a latex polymer and optionally one or more other components, wherein the mass ratio of hydraulic binding agent to latex polymer is between about 1:1000 and about 1000:1, to form a mixture;

(b) placing the mixture in an essentially prismatic disposition wherein the mixture sets, thereby forming a set essentially shaped mixture; and (c) permitting the set essentially shaped mixture to harden, thereby forming the essentially shaped cementitious product;

wherein a 51-mm-thick sample of the product halts a full metal jacket bullet fired into the sample's thickness from a 9 mm handgun at a distance of 15 meters and wherein spallation resulting from entry of the projectile into the thickness occurs in a zone on the entry surface not greater than about 50 times the area of the bullet hole resulting from the bullet's entry into the thickness of the sample.

A material such as is described herein accordingly provides a material less susceptible than materials known in the art to brittle failure in either blast or ballistic applications. A material such as is described herein may incorporate latex polymer film into a microstructure of the material as a means for influencing toughness characteristics. A material such as is described herein may possess a specified ductile behavior according to the material's the polymer/cement ratio, i.e., defining the material's modulus of elasticity according to the polymer/hydraulic binder ratio. A material such as is described herein may be used to create either individual specimens or in full pour type applications, with examples not being limited to bricks and walls, respectively. As a coating, a material such as is described herein may be applied with any common set up, with examples not being limited to pour, gunnite, shot-crete, low pressure spray, trowel, brush, roller, knife, direct injection, pumping apparatus or simply applied by hand.

Direct tensile strength and modulus of rupture of a polymer modified cementitious material may increase with increases in polymer/cement ratio up to some optimum level, then the mechanical property strength values gradually decrease with increases in polymer/cement ratio. Material deformation continually increases as a result of more elastic behavior with increases in polymer/cement ratio. In direct tensile strength testing, elongation at break increases continually with increases in polymer/cement ratio though strength values may gradually decrease beyond an optimum value with increases in polymer/cement ratio.

DETAILED DESCRIPTION OF THE PREFERRED EMBODIMENTS

Figure 1:
FIG. 1 shows brittle failure of non-polymer modified control mortar sample after being shot with a 9 mm 115 grain handgun bullet at a range of 15 m (49 ft).

The invention now will be described more fully hereinafter. The invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. "Or"

as in "A or B" is conjunctive, not disjunctive, and accordingly in this instance means at least one member of the set {A, B}.

A material such as is described herein provides inter alia an optionally load-bearing essentially shaped cementitious product manufactured by steps comprising:

(a) admixing a liquid medium, a hydraulic binding agent, a latex polymer and optionally one or more other components, wherein the mass ratio of hydraulic binding agent to latex polymer is between about 1:1000 and about 1000:1, to form a mixture;

(b) placing the mixture in an essentially prismatic disposition wherein the mixture sets, thereby forming a set essentially shaped mixture; and (c) permitting the set essentially shaped mixture to harden, thereby forming the essentially shaped cementitious product;

wherein a 51-mm-thick sample of the product halts a full metal jacket bullet fired into the sample's thickness from a 9 mm handgun at a distance of 15 meters and wherein spallation resulting from entry of the projectile into the thickness occurs in a zone on the entry surface not greater than about 50 times the area of the bullet hole resulting from the bullet's entry into the thickness of the sample.

A material such as is described herein accordingly provides a material less susceptible than materials known in the art to brittle failure in either blast or ballistic applications. A material such as is described herein may incorporate latex polymer film into a microstructure of the material as a means for influencing toughness characteristics. A material such as is described herein may possess a specified ductile behavior according to the material's the polymer/cement ratio, i.e., defining the material's modulus of elasticity according to the polymer/hydraulic binder ratio. A material such as is described herein may be used to create either individual specimens or in full pour type applications, with examples not being limited to bricks and walls, respectively. As a coating, a material such as is described herein may be applied with any common set up, with examples not being limited to pour, gunnite, shot-crete, low pressure spray, trowel, brush, roller, knife, direct injection, pumping apparatus or simply applied by hand.

Direct tensile strength and modulus of rupture of a polymer modified cementitious material may increase with increases in polymer/cement ratio up to some optimum level, then the mechanical property strength values gradually decrease with increases in polymer/cement ratio. Material deformation continually increases as a result of more elastic behavior with increases in polymer/cement ratio. In direct tensile strength testing, elongation at break increases continually with increases in polymer/cement ratio though strength values may gradually decrease beyond an optimum value with increases in polymer/cement ratio.

A material such as is described herein may accordingly possess any of a wide range of performance characteristics. Table 1 displays experimental results for a rapid setting hydraulic cement based patch and repair mortar at different polymer/cement ratios after curing in a sealed plastic container in ambient outdoor Kentucky springtime conditions for 27 days (13 Mar. 2012-9 Apr. 2012) when exposed to a single gunshot from a 9 mm handgun with 115 grain full metal jacket bullets at a distance of 15 meters (49 ft).

TABLE 1

Results for square mortar panel with side length 165 mm (6.5 in) and depth 51 mm (2 in) when shot with 9 mm 115 grain handgun bullet at a distance of 15 m (49 ft). The term "p/c" refers here as elsewhere in the present document to polymer/cement ratio.

| Mortar | Bullet | Distance | response | observations |
| --- | --- | --- | --- | --- |
| Control | 9 mm 115 grain | 15 m | brittle failure | Spall |
| p/c = 2/5 | 9 mm 115 grain | 15 m | no failure | no spall |
| p/c = 1/1 | 9 mm 115 grain | 15 m | pass through | little spall |
| p/c = 2/1 | 9 mm 115 grain | 15 m | pass through | little spall |

As seen in Table 1, a non-polymer modified control sample experienced brittle failure. A mortar with polymer/cement ratio of 2/5 stopped a bullet with little cracking A mortar with polymer/cement ratio of 1/1 allowed a bullet to pass completely through with small entrance and somewhat small exit displaying little spall and little cracking A mortar with polymer/cement ratio of 2/1 also allowed a bullet to pass completely through with small entrance and somewhat small exit displaying little spall and little cracking.

These results were obtained with stand-alone, unconfined mortar specimens which were 51 mm (2 in) thick. The failure modes associated with the control, p/c=2/5, p/c=1/1 and p/c=2/1 provide a clear illustration of optimum strength characteristics with increasing polymer/cement ratio. Although materials with p/c=1/1 and p/c=2/1 allowed complete bullet pass through for these thin members, such materials present viable options for mitigating spalling behavior in stand alone applications as increasing specimen thickness increases a material's capacity to absorb energy. An important characteristic for materials tested at this specimen thickness is the relatively insignificant amount of cracking for mortars with polymer/cement ratio of 2/5, 1/1 and 2/1. Insignificant cracking illustrates a material's ability to maintain sufficient structural integrity in ideal applications.

A material such as is described herein displays excellent adhesion characteristics to cementitious materials. Polymer modified cementitious materials typically result in cohesive failure of the cement based substrate material when tested in direct pull off testing similar to ASTM C1583, Standard Test Method for Tensile Strength of Concrete Surfaces or the Bond Strength or Tensile Strength of Concrete Repair and Overlay Materials by Direct Tension (Pull Off Method). Given the likelihood the substrate material will fail before the adhesion bond fails, a material such as is described herein provides a spall-resistant polymer modified cementitious coating material. Furthermore, a material such as is described herein is suitable for use either creating or supplementing spall liners, with examples of spall liners not being limited to use with either construction or "up armoring" of armored vehicles, maritime vessels, structures and automobiles. For example, at a p/c=1/1 after 28 days of curing in ambient conditions, a material such as is described herein provided a very tough, flexible polymer modified cementitious coating with flexural strength values of approximately 10 MPa (1450 psi) and direct tensile strength values of approximately 7 MPa (1000 psi) and compressive strength values near 28 MPa (4000 psi) effectively mitigating spall if the cementitious substrate material fails in brittle fashion as a result of a sudden shock wave, vacuum or gunshot.

A material such as is described herein can be applied to reinforced concrete structures in similar fashion to automobile crumple zones. Polymer modified cementitous materials are typically lower in compressive strength, but higher in both direct tensile strength and flexural strength when compared with contemporary cementitious materials. Such mechanical property correlations allow for significant material deformation while maintaining some sense of structural integrity. For the sake of load bearing columns in blast or ballistic applications, a section of column is cast with polymer modified mortar with sufficient compressive strength and ductility as defined by polymer/cement ratio such that the polymer modified portion will slightly deform while maintaining the majority of its structural integrity when exposed to significant, sudden loads, similar to a single-use shock absorber, as these polymer modified cementitious materials have no memory. Such behavior characteristic of a material such as is described herein can be generalized to the case of being incorporated into development of layered systems designed for ballistic or blast loading, not being limited to the concept underlying functionality of Chobham type armor systems.

A material such as is described herein reduces spall of cementitious materials under blast or ballistic loading scenarios. A material such as is described herein may be utilized to create spall liners, modular units, cast in place structures, coating materials, insert materials, or any number of possibilities given the vast range of mechanical property performance correlations which can be achieved by varying the polymer/cement ratio in cementitious materials formulations. A material such as is described herein allows creation of ductile cementitious materials without the addition of fibers or other means of reinforcement, though addition of fibers and reinforcing materials may benefit the performance of a material such as is described herein for specific applications.

Latex polymers suitable for a material such as is described herein may include elastomeric latexes, thermoplastic latexes and thermosetting latexes or any combination thereof. Elastomeric latexes consist of natural and synthetic rubbers. Thermoplastic latexes are not limited to examples such as polyacrylic esters, copolymers of vinyl acetate/ethylene (VAE or EVA), terpolymers of vinyl acetate/ethylene/vinyl chloride (VAE/VC), terpolymers of vinyl acetate/ethylene/veova (VAE/Veova), VAE/Veova/VC, styrene acrylics, poly styrene acrylic esters, polyvinyl acetate, polyvinyl propionate, polypropylene, poly vinylidene chloride vinyl chloride (PVDC). Thermosetting latexes are not limited to epoxies. Examples of VAE liquid polymer dispersions are Vinnapas 526BP and Mowilith LDM 1852. An example of a styrene butadiene rubber (SBR) liquid polymer dispersion is Axilat SB500. An example of an acrylic liquid polymer dispersion is Axilat L8840.

Dispersible polymer powders are characterized such that they disperse readily into their constituent polymer components when exposed to water thereby forming a tough, elastic water resistant polymer film. Examples of dispersible polymer powders according to a material or process such as is described herein are copolymers of vinyl acetate and ethylene (VAE) are Vinnapas 5044N and Vinnapas 5010N. A suitable example for a polymer powder of styrene butadiene rubber (SBR) chemistry is Axilat PSB150.

When used in the present context, the term "hydraulic binder" refers to a pulverized material in the solid, dry state, which when mixed with water yields mixtures which are able to set and harden, with a common example being the term "cement". A hydraulic binder may comprise one or more individual component materials. A hydraulic binder may undergo setting and hardening when exposed to suitable medium. Utilizing cement chemistry nomenclature where $C=CaO$, $\acute{S}=SO_3$, $S=SiO_2$, $A=Al_2O_3$, $H=H_2O$, $F=Fe_2O_3$, N=sodium based materials, K=potassium based materials, any of such hydraulic binder materials may hydrate to form materials containing C-A-$\acute{S}$-H type phases and (N,K)-A-$\acute{S}$-H type phases in addition to more traditional type phases common to ordinary portland cement hydration. Examples of such individual component materials should not be limited to all forms of calcium sulfate, hydrated lime, quicklime, alumina, alumina tri-hydrate, alite, belite, tricalcium aluminate, yeelimite (kleins compound), calcium aluminate, $C_{12}A_7$, coal ash, slag, silica fume, pozzolana, clay, bauxite, red mud, brownmillerite or any other suitable material or combination of materials which when exposed to water or other suitable medium is able to set and harden. The term "cement" includes hydraulic and alite cements such as portland cement, blended cement, slag cement, pozzolanic cement, calcium aluminate cement, calcium sulfoaluminate cement or any other common cementing material or combination thereof.

A material such as is described herein may also comprise one or more other materials such as viscosity modifiers commonly used in cementitious systems. These viscosity modifiers are typically polysaccharides and their derivatives including polysaccharide ethers soluble in water such as cellulose ether, starch ether (amylose and/or amylopectin and/or their derivatives), guar ether and/or dextrins. It is also possible to use synthetic polysaccharides such as anionic, non-ionic or cationic heteropolysaccharides such as xanthan gum or wellan gum. The polysaccharides can, but need not, be chemically modified with carboxymethyl groups, carboxyethyl groups, hydroxyethyl groups, hydroxypropyl groups, methyl groups, ethyl groups, propyl groups and/or long chain alkyl groups. Further natural stabilizing systems consist of alginates, peptides and/or proteins such as gelatin, casein and/or soy protein. Examples include dextrins, starch, starch ether, casein, soy protein, hydroxyl alkyl cellulose and/or alkyl hydroxalkyl cellulose. Other synthetic stabilizing systems include one or several polyvinyl pyrrolidones and/or polyvinyl acetals having molecular weights of approximately 2000 to 400,000; fully or partially saponified and/or modified fully or partially saponified poly-vinyl alcohols with a degree of hydrolysis of approximately 70 to 100 mole %, or in another respect approximately 80 to 98 mole %. Additionally, poly-vinyl alcohols may be incorporated at larger percentages to further enhance a material's ability to mitigate spall. Commonly referred to rheology modifying materials have been known to include methylhydroxyethylcellulose, hydroxymethylethylcellulose, carboxymethylcellulose, methylcellulose, ethylcellulose, hydroxyethylcellulose, hydroxyethylpropylcellulose, etc.

A material such as is described herein may also comprise one or more other materials such as plasticizers, superplasticizers, high range water reducers or any suitable product which delivers desired characteristics. Common materials used for such purposes are melamine sulphonate formaldehyde condensates, naphthalene sulphonates, calcium lignosulphonates, sodium lignosulphonates, saccharose, sodium gluconate, sulphonic acids, carboxylates, polycarboxylates, carboxylic acids, polyhydroxycarboxilic acids, sulphonated melamine or any other suitable material, whether it be naturally occurring or processed. Examples are not limited to the Glennium family of products or the Melflux family of products.

A material such as is described herein may also comprise one or more other materials such as set retarders. Set retarders are often used to delay the hydration reactions associated with hydraulic binders and possibly reactions of other constituent components. Set retarders can vary in effectiveness of delaying onset or rapidity of hydration for differing hydraulic binders and/or different or varying combinations of constituent materials. Commonly used set retarders are not limited to tartaric acid, citric acid, sodium citrate, hydroxyl carboxylic acids and their salts, malic acid, sodium gluconate, sucrose, etc.

A material such as is described herein may also comprise one or more other materials such as set accelerators or accelerating admixtures. Such materials are frequently used, but not limited to increasing the rate of hydration reaction or providing some means of control for specific interactions which are inevitable when certain materials interact under certain conditions. Common examples of set accelerators or accelerating admixtures include but are not limited to lithium carbonate, calcium formate, quicklime, calcium oxide, sodium chloride, various alkali earth metals and their salts, aluminous materials when combined with other proper constituents, etc.

A material such as is described herein may also comprise one or more other materials such as surfactants for various purposes, whether they be foaming materials, de-foaming materials or provide any other desired properties. Suitable foaming and stabilizing surfactants may include but are not limited to mixtures of an ammonium salt of an alkyl ether sulfate, a cocoamidopropyl betaine surfactant, a cocoamidopropyl dimethylamine, oxide surfactant, mixtures of an ammonium salt of an alkyl ether sulfate surfactant, a cocoamidopropyl hydroxysultaine surfactant, hydrolyzed keratin, an alkyl or alkene dimethylamine oxide surfactant, aqueous solutions of an alpha-olefinic sulfonate surfactant and a betaine surfactant and/or any other suitable materials. An example of a foaming material is ZONESEAL 2000 foaming additive commercially available from Halliburton.

A material such as is described herein may also comprise one or more other materials such as defoaming materials which also may be known as air detrainers. These types of defoaming materials can be very important for creating impermeable coatings. These defoaming materials typically decrease the amount of entrained air within the designed system. Common examples of these materials are tributyl phosphate dibutyl phthalate, octyl alcohol, water insoluble esters of carbonic and boric acid as well as silicone based materials. Common examples of available defoamers include but are not limited to Agitan P800 and Surfynol MD600.

A material such as is described herein may also comprise one or more other materials such as "fugitive plasticizers" or "coalescing solvents" with a primary function being not limited to aiding the mechanisms for facilitating film formation or film integration during either the drying, setting, hardening or overall curing process. Some common "fugitive plasticizers" or "coalescing solvents" are volatile organic compounds not being limited to the examples including toluene, xylene, n-butyl acetate, ethoxyethyl acetate, ethyleneglycol monobutyl ether acetate, and diethyleneglycol monobutyl ether acetate.

A material such as is described herein may also comprise one or more other materials such as filling materials. Typically, filling materials are finely ground materials. These fillers often possess, but should not be limited to a particle size distribution with both median and mean values less than 100 microns. This is one classification characteristic when comparing fillers and aggregate. Examples of common filling materials or fillers are ground carbonates with examples being calcium carbonate and sodium bi-carbonate, all classifications of clay materials, metakaolin, diatomaceous earth, carbon black, activated carbon, titanium dioxide, finely ground quartz, finely ground silica based materials often referred to as micro-silica, silica fume, fumed silica, kiln dust, pulverized stone, pulverized glass, ultra fine fly ash, fly ash, blast furnace slag, ground granulated blast furnace slag (GGBS), ground recycled materials, pulverized glass, crum rubber, recycled tires, powdered waste from recycling automobiles, powdered waste from recycling electronic components, etc.

A material such as is described herein may also comprise one or more common reinforcing materials typically used in either cementitious materials design or coating materials design such as fibrous materials or mesh type materials. Examples of fiber type materials should not be limited to metal fibers, organic fibers, synthetic fibers, polymeric fibers, carbon nano tube type fibrous materials or any mixture of fibers. Examples of fibers should not be limited to polyvinyl alcohol fibers (PVA), polyacrylonitrile fibers (PAN), polyethylene fibers (PE), high density polyethylene fibers (HDPE), polypropylene fibers (PP) or homo or co-polymers of polyamide or polyimide. Mixtures of any type of fibers may also be used, especially mixtures of fibers with different physical dimensions and different orientations. Addition of fibrous material to cementitious type mixtures may be facilitated by use of a viscosity modifying agent which ensures proper dispersal of fibers throughout the mixture, with an example being Kelco-Crete which is an anionic polysaccharide from CP Kelco. Furthermore, aramid type materials, not limited to currently available material forms such as pulp, yarn, fibers, or mesh, such potentially being comprised of chains with AABB configuration, with examples not being limited to Kevlar, Twaron, Nomex, New Star and Teijinconex, may be included in a multitude of possible arrays. Additionally, novel materials such as combinations of boron oxides and polyethylene may be utilized as means of reinforcement. Mesh type materials may also be used as a means of reinforcement. Examples of mesh type materials should not be limited to metal mesh, alloy mesh, fabric mesh, carbon fiber mesh, carbon nano-tube mesh, fiberglass mesh, polyethylene mesh, polypropylene mesh or aramid mesh. Additionally, materials with more complex design characteristics may be included, with examples not being limited to shear thickening fluids and not so commonly used metals such as depleted uranium. Other more common types of reinforcement should not be limited to theories surrounding practices of pre-stressed concrete, post-stressed concrete, reinforced concrete where any reinforcing type material could potentially be placed within the constructed material with fully bonded orientation, partially bonded orientation, un-bonded orientation; or, the reinforcing material may be bonded in any fashion to any material comprising the constructed material.

A material such as is described herein may also comprise one or more other materials such as materials sometimes needed for protection from microorganism attack. As a result, the mixing process may incorporate fungicides or anti-bacteria substances. Examples of such materials should not be limited to pentachlorophenol, sodium o-phenylphenate and/or various organic mercury compounds.

A material such as is described herein may also comprise one or more other materials such as flame-retarding materials. Examples of flame retarding materials should not be limited to chlorinated paraffin waxes and antimony trioxide.

A material such as is described herein may also comprise one or more other materials such as common aggregate materials not limited to specification of chemical composition or specimen geometry. Examples of common aggregate materials are siliceous materials with one specific example being silica sand, calcium based materials with an example being stone, limestone, river gravel, river sand, pea gravel, pozzolanic material with an example being volcanic rock, bottom ash, cinders, along with numerous other possibilities for both recycled and manufactured aggregates. A material such as is described herein may also comprise engineered aggregate materials such as high performance ceramic aggregate or light weight aggregate.

A material such as is described herein may also comprise one or more other materials such as antioxidants to retard deterioration of polymeric materials, and optionally surface active substances to enhance colloidal stability and ability to "wet out" surfaces. Coating materials may become exposed to acidic materials on the molecular level due to consequences from polymer hydrolysis, with one example being the liberation of hydrogen chloride. Common anti-oxidant materials should not be limited to phenyl-2-naphthylamine or carbon black. Common acid accepting substances for mix design purposes should not be limited to zinc oxide and calcium carbonate.

A material such as is described herein may also comprise one or more other materials such as anti-freeze materials not limited to ethylene glycol or glycerol.

A material such as is described herein may also comprise one or more corrosion inhibiting substances with one example not being limited to sodium benzoate.

A material such as is described herein may also comprise one or more other materials such as powdered metals, powdered alloys or powdered conductive materials for the purposes of producing a coating capable of conducting either electron, proton or neutron transfer in either continuous or dis-continuous fashion. Such conductive materials should not be limited to powder form, such conductive materials may also be added in the form of fibrous material, platy material, ground material, spherical material or virtually any geometry required for the given degree of conductivity.

A material such as is described herein may also comprise one or more other materials such as pigments, dyes or other common color enhancing additives.

A material such as is described herein may also comprise one or more chemical materials with specific purpose such as alkali activating agents or polymer cross-linking agents. Examples of alkali activating agents should not be limited to sodium hydroxide, potassium hydroxide or magnesium hydroxide. Polymer cross-linking agents should not be limited to sodium borate and maleic anhydride.

In an embodiment, a process such as is described herein comprises formation of a mixture comprising sufficient liquid medium, hydraulic binding agent and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, superplasticizer and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, superplasticizer, rheology modifier and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, superplasticizer, rheology modifier, filler and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, superplasticizer, rheology modifier, filler, aggregate and latex polymer such that the mass ratio of polymer solids (or effective polymeric material amount) to hydraulic binder is within the range of 1/1000 to 1000/1.

In an embodiment, a process such as is described herein formation of a mixture comprising sufficient liquid medium, hydraulic binding agent, superplasticizer, rheology modifier, filler, aggregate and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, superplasticizer, rheology modifier, filler and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier, accelerator and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier, accelerator, retarder and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier, accelerator, retarder, means of re-inforcement and latex polymer such that the mass ratio of polymer solids (or effective polymeric material amount) to hydraulic binder is within the range of 1/1000 to 1000/1.

In an embodiment, a process such as is described herein comprises formation of a mixture comprising sufficient liquid medium, hydraulic binding agent, filler, rheology modifier, accelerator, retarder, means of re-inforcement, aggregate and latex polymer such that the mass ratio of polymer solids (or effective polymeric material amount) to hydraulic binder is within the range of 1/1000 to 1000/1.

In an embodiment, a process such as is described herein comprises formation of a mixture containing hydraulic binding agent and latex polymer with any common constituent material for cement mix design with examples not being limited to filler, aggregate, re-inforcing material, accelerator, retarder, plasticizer, super-plasticizer, rheology modifier, flame retarding material, conductive material, insulating material, anti-freeze material, anti-oxidizing material, pigment material, defoaming material, air entraining material, surfactant material, cross-linking material, alkali activating material biocide material, anti-fungal material or fugitive plasticizing material.

The following examples are meant for illustrative purposes.

Figure 2:
FIG. 2 shows a successful stop while maintaining structural integrity for polymer modified cement mortar sample with polymer/cement ratio of 2/5 after being shot with a 9 mm 115 grain handgun bullet at a range of 15 m (49 ft).
Figure 3:
FIG. 3 shows a pass through while maintaining structural integrity for polymer modified cement mortar sample with polymer/cement ratio of 1/1 after being shot with a 9 mm 115 grain handgun bullet at a range of 15 m (49 ft).
Figure 4:
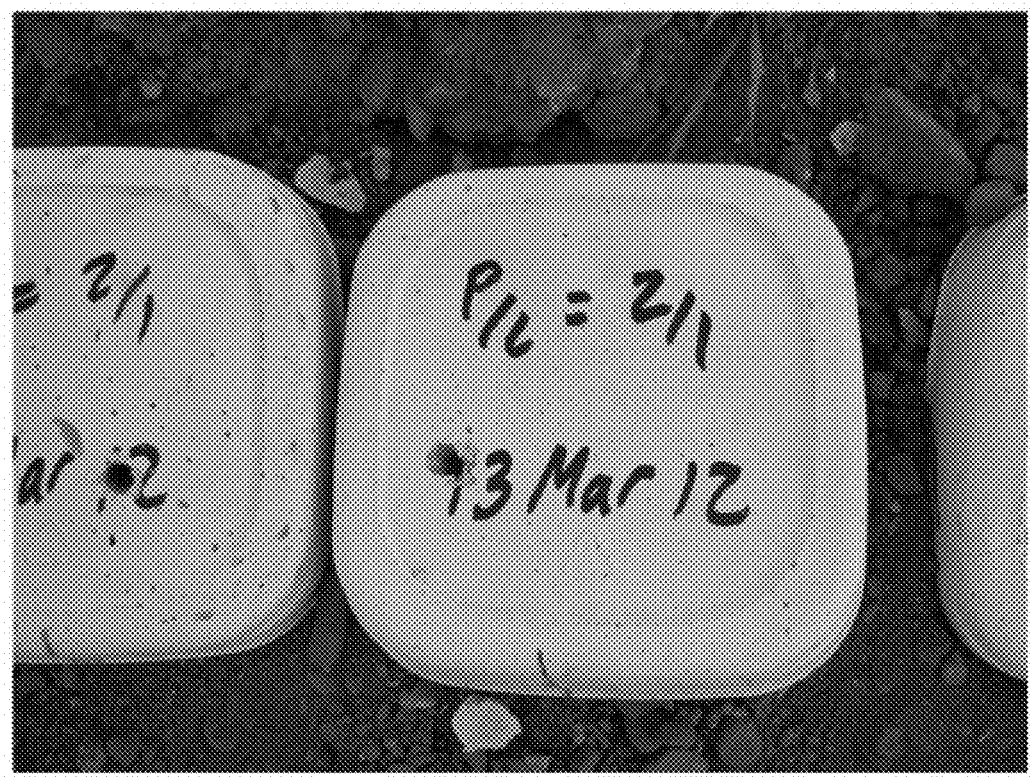
FIG. 4 shows a pass through while maintaining structural integrity for polymer modified cement mortar sample with polymer/cement ratio of 2/1 after being shot with a 9 mm 115 grain handgun bullet at a range of 15 m (49 ft).

FIGS. 1-5 illustrate field testing of "spall behavior" for cement mortars similar to the mortars displayed in Table 2. FIGS. 1-5 are further described by reference to Table 1. FIGS. 1-5 clearly demonstrate the utility of a material or process such as is described herein for defining ductile behavior of materials incorporating hydraulic binding agents by varying the material's polymer/hydraulic binding agent ratio. The ductile behavior of the material influences the toughness of the material which defines the "spall behavior" of the material. FIG. 1 illustrates a "control" sample which contains no polymer exhibiting brittle behavior, with significant spall, after being shot with a 9 mm handgun at a distance of 15 m. FIG. 2 illustrates a mortar sample with polymer/cement ratio of 2/5 exhibiting tough, ductile behavior, actually stopping the bullet while maintaining structural integrity after being shot with a 9 mm handgun at a distance of 15 m. FIG. 3 illustrates a mortar sample with polymer/cement ratio of 1/1 exhibiting elastic behavior, actually allowing the bullet to pass through with minimal spall while maintaining structural integrity after being shot with a 9 mm handgun at a distance of 15 m. FIG. 4 illustrates a mortar sample with polymer/cement ratio of 2/1 exhibiting elastic behavior, actually allowing the bullet to pass through with minimal spall while maintaining structural integrity after being shot with a 9 mm handgun at a distance of 15 m.

Figure 5:
FIG. 5 shows bullet entrances for polymer modified hydraulic cement mortars at polymer cement ratios of 2/5 (bottom), 1/1 (middle) and 2/1 (top).
Figure 6:
FIG. 6 shows bullet exits for polymer modified hydraulic cement mortars at polymer cement ratios of 2/5 (bottom), 1/1 (middle) and 2/1 (top) where it can be seen that p/c=2/5 stopped the bullet while maintaining structural integrity, p/c=1/1 had little spall while maintaining structural integrity and p/c=2/1 had even less spall while maintaining structural integrity.

FIG. 5 and FIG. 6 are bullet entrance and exit comparisons for mortar samples with polymer/cement ratios of 2/5, 1/1 and 2/1. For this specific experiment, the mortar with polymer/cement ratio of 2/5 stopped the bullet with no spall; whereas, the mortars with polymer/cement ratios of 1/1 and 2/1 allowed the bullet to pass through the samples. FIG. 6 illustrates decreased spall for the sample with polymer/cement ratio of 2/1 when compared with the sample with p/c=1/1.

Uni-axial direct tensile strength stress/strain diagrams were obtained per ASTM C307 for mortar formulations in Table 2. Mortars possessing different polymer/cement ratios demonstrated different ductile behaviors. Greater deformation at break was observed with increasing polymer/cement ratio. An increased area under the curve was noted for increasing polymer/cement ratio.

TABLE 2

Polymer modified cement mortar formulations

|  | p/c = 0.15 | p/c = 0.3 | p/c = 0.45 |
| --- | --- | --- | --- |
| Hydraulic Binder (g) | 660 | 660 | 660 |
| Polymer (g) | 100 | 200 | 300 |
| Fine Sand (g) | 1375 | 1375 | 1375 |
| Coarse Sand (g) | 125 | 125 | 125 |
| Admixtures (g) | 5 | 5 | 5 |
| Water (g) | 230 | 230 | 250 |

Figure 7:
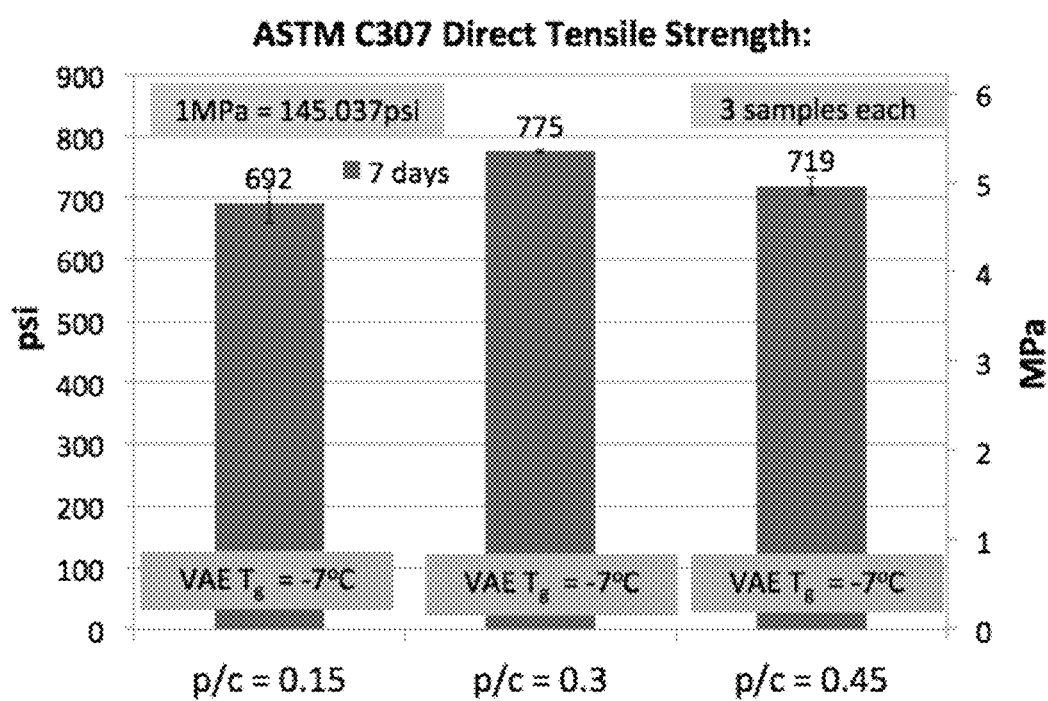
FIG. 7 shows a bar graph depicting direct tensile strength of polymer modified mortar samples at polymer/cement ratios of 0.15, 0.3 and 0.45.
Figure 8:
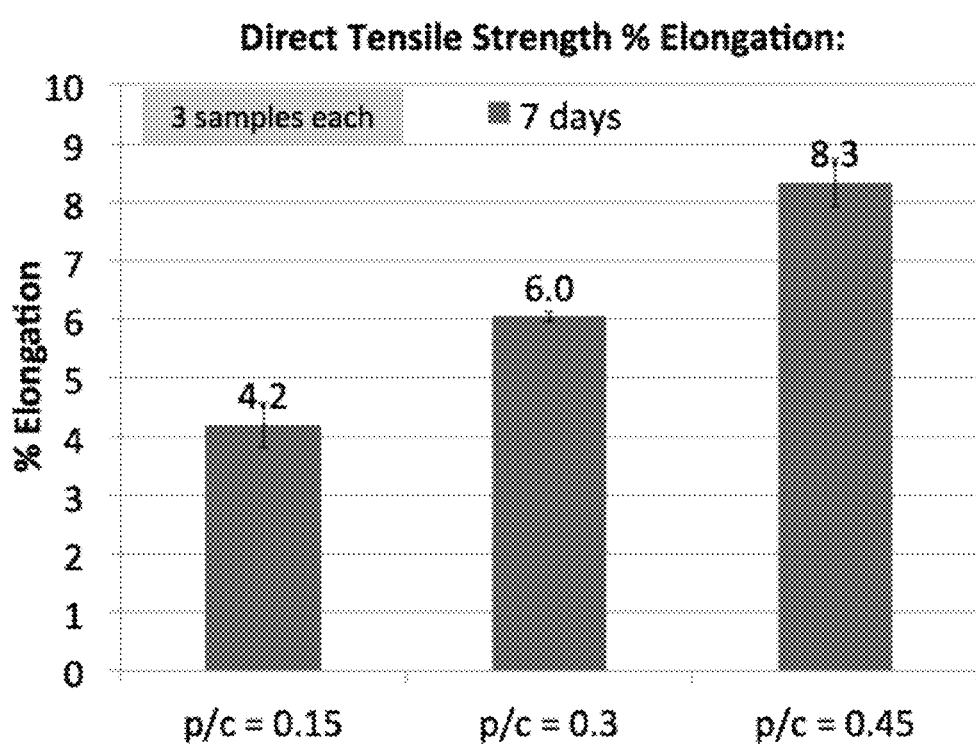
FIG. 8 shows a bar graph depicting percent elongation at break for direct tensile strength dog bone samples at polymer/cement ratios of 0.15, 0.3 and 0.45.

FIG. 7 and FIG. 8 display direct tensile strength information for the mortars displayed in Table 2. FIG. 7 shows the direct tensile strength being similar for the polymer modified mortars displayed in Table 2. FIG. 8 displays average elongation at break, as a percentage of total specimen length, for the average values displayed in FIG. 10. FIG. 8 clearly illustrates different ductile behavior as a function of polymer/cement ratio for the polymer modified mortars displayed in Table 2.

FIG. 7 displays direct tensile strength values for the polymer modified mortars listed in Table 2 after curing for seven days in a sealed plastic bag at ambient laboratory temperature of 23° C. (73° F.). The direct tensile strength values for mortars possessing polymer/cement ratios of 0.15, 0.3 and 0.45 are 692 psi (4.8 MPa), 775 psi (5.3 MPa) and 719 psi (4.9 MPa), respectively. Statistical software was utilized for data analysis. One-way ANOVA was used to test the equality of the population means for direct tensile strength testing of polymer modified mortars at polymer/cement ratios of 0.15, 0.3 and 0.45. Results from ANOVA are: $F(2/6)=12.9$, $p=0.007$, pooled standard deviation=20.48 and $R2=81.14\%$. Based upon the F value of 12.9 and corresponding p-value=0.007, if an alpha value of 0.05 is chosen, it is safe to reject the null hypothesis and ultimately conclude that at least two means differ from one another, and this inequality is highly unlikely due to chance. Further "post hoc" statistical analysis utilizing Tukey's Honestly Significant Difference Test assigned the mortar with p/c=0.15 to "B" direct tensile strength classification, the mortar with p/c=0.3 to "A" direct tensile strength classification while the mortar with p/c=0.45 has also been assigned to "B" direct tensile strength classification. For the Tukey comparison method, mortars that do not share the same letter strength classification are significantly different.

Table 3 compares common empirical equations for predicting direct tensile strength behavior for ordinary portland cement based concrete with experimental results for polymer modified mortar. The equations were sourced from Hassoun, M. N., 1985, Design of Reinforced Concrete Structures ISBN 0-534-03759-4 and Illston, J. M., Domone, P. L. J., 2001, Construction Materials Their Nature and Behavior, 3rd Edition, ISBN 0-419-25860-3.

The empirical formulations displayed in Table 3 reference the compressive strength (f'c) of concrete for predicting tensile strength behavior. As seen in Table 3, the polymer modified mortars do not follow any of the reported empirical relationships for predicting direct tensile strength behavior as a function of compressive strength. The presence of tough flexible polymer film somewhat uniformly distributed throughout the microstructure increases the ductile behavior of the polymer modified material ultimately leading to deviation from conventional concrete behavior.

TABLE 3

Comparison of polymer modified mortar experimental results to predictive equations for non-polymer modified concrete illustrating increased ductile behavior with increases in polymer/cement ratio

| | | p/c = 0.15 | p/c = 0.3 | p/c = 0.45 |
|---|---|---|---|---|
| Direct Tensile Strength Actual | ASTM C307 | 692 psi (4.77 MPa) | 775 psi (5.34 MPa) | 719 psi (4.96 MPa) |
| Direct Tensile Strength Prediction | $f_{dt} = 0.06 \cdot f'c$ | 221 psi (1.52 MPa) | 194 psi (1.34 MPa) | 157 psi (1.08 MPa) |
| Direct Tensile Strength Prediction | $f_{dt} = 0.08 \cdot f'c$ | 295 psi (2.03 MPa) | 259 psi (1.78 MPa) | 209 psi (1.44 MPa) |
| Direct Tensil Strength Prediction | $f_{dt} = 0.07 \cdot f'c$ | 258 psi (1.78 MPa) | 227 psi (1.57 MPa) | 183 psi (1.26 MPa) |
| Direct Tensile Strength Prediction | $f_{dt} = 0.11 \cdot f'c$ | 405 psi (2.79 MPa) | 356 psi (2.45 MPa) | 287 psi (1.98 MPa) |

FIG. 8 displays percent elongation at break as measured by the universal testing machine for direct tensile strength information. The average elongation at break values for direct tensile strength dog bone samples possessing polymer/cement ratios of 0.15, 0.3 and 0.45 are 4, 6 and 8 percent, respectively. The information displayed in both FIG. 7 and FIG. 8 illustrates a trend for increased ductile behavior with increases in polymer/cement ratio.

Figure 9:
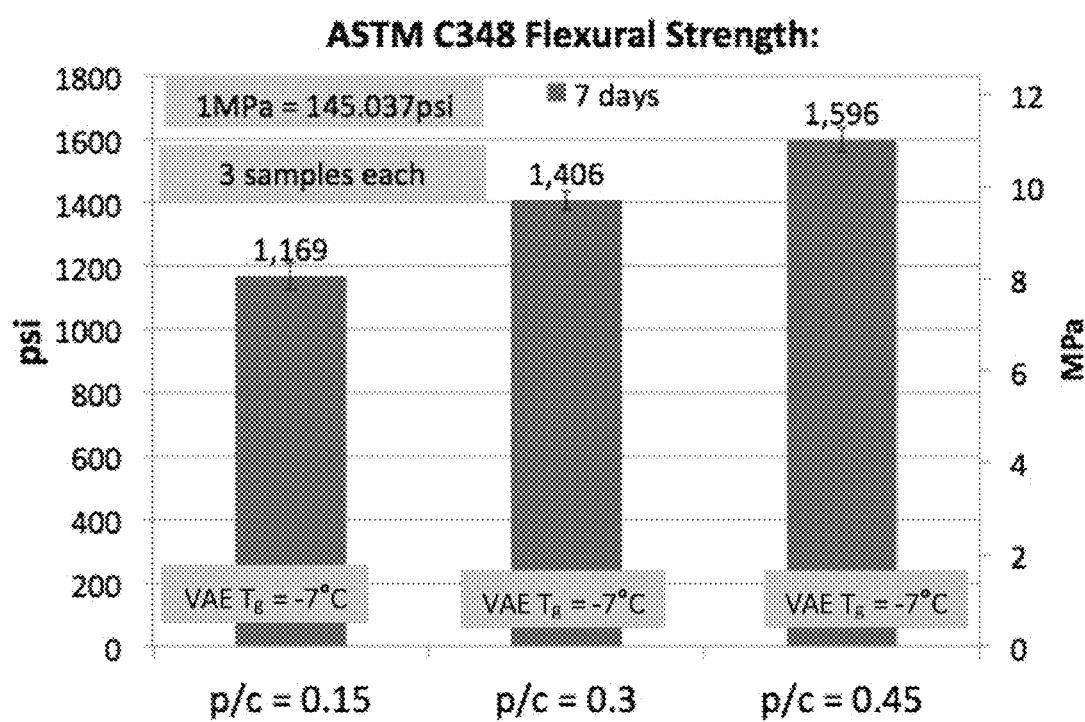
FIG. 9 shows a bar graph depicting flexural strength of polymer modified cement mortar samples at polymer/cement ratios of 0.15, 0.3 and 0.45.
Figure 10:
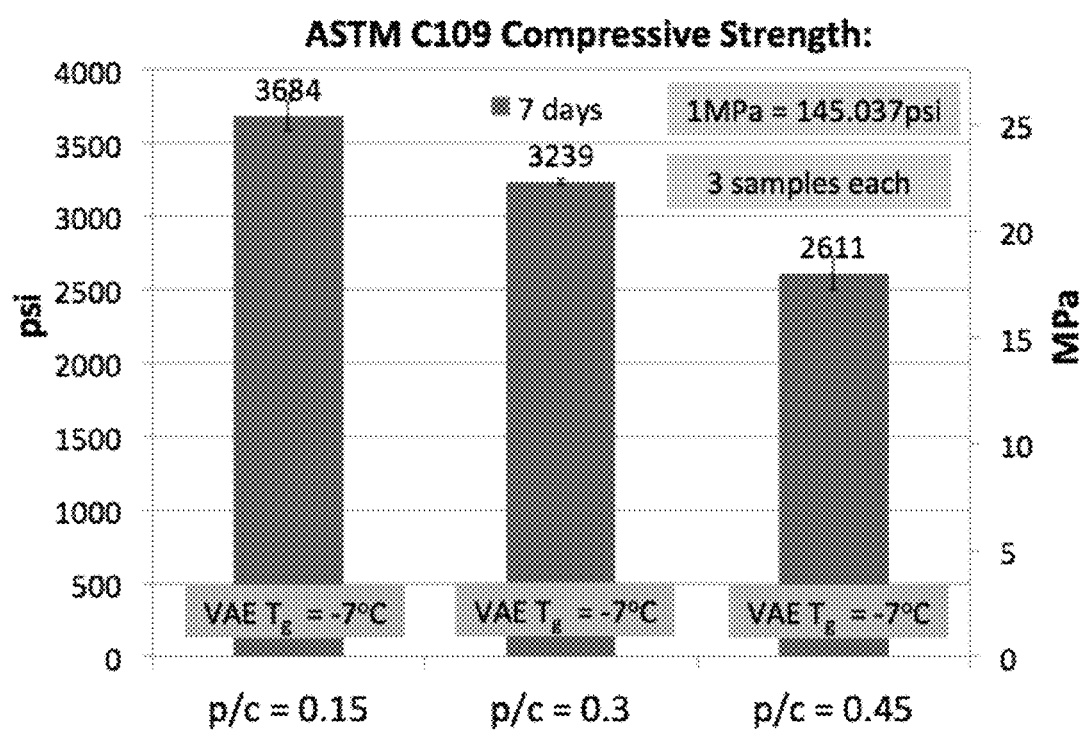
FIG. 10 shows a bar graph depicting compressive strength of polymer modified cement mortar at polymer/cement ratios of 0.15, 0.3 and 0.45.

FIG. 9 and FIG. 10 display flexural strength information and compressive strength information for the polymer modified mortars displayed in Table 2. The trends displayed in both FIG. 9 and FIG. 10 clearly demonstrate a difference in ductile behavior for mortars possessing different polymer/cement ratios.

FIG. 9 displays flexural strength values for the polymer modified mortars listed in Table 2 after curing for seven days in a sealed plastic bag at ambient laboratory temperature of 23° C. (73° F.). The flexural strength values for mortars possessing polymer/cement ratios of 0.15, 0.3 and 0.45 are 1169 psi (8 MPa), 1406 psi (9.7 MPa) and 1596 psi (11 MPa), respectively. Statistical software was utilized for data analysis. One-way ANOVA was used to test the equality of the population means for flexural strength testing of polymer modified mortars at polymer/cement ratios of 0.15, 0.3 and 0.45. Results from ANOVA are: $F(2/6)=96.74$, $p=0.000$, pooled standard deviation=0.26 and $R^2=96.99\%$. Based upon the F value of 96.74 and corresponding p-value=0.000, if an alpha value of 0.05 is chosen, it is safe to reject the null hypothesis and ultimately conclude that at least two means differ from one another, and this inequality is highly unlikely due to chance. Further "post hoc" statistical analysis utilizing Tukey's Honestly Significant Difference Test assigned the mortar with p/c=0.15 to "C" flexural strength classification, the mortar with p/c=0.3 to "B" flexural strength classification while the mortar with p/c=0.45 has been assigned to "A" flexural strength classification. For the Tukey comparison method, mortars that do not share the same letter strength classification are significantly different.

Table 4 compares common empirical equations for predicting flexural strength behavior for ordinary portland cement based concrete with experimental results for polymer modified mortar. The equations were sourced from Hassoun, M. N., 1985, Design of Reinforced Concrete Structures ISBN 0-534-03759-4 and llston, J. M., Domone, P. L. J., 2001, Construction Materials Their Nature and Behavior, 3rd Edition, ISBN 0-419-25860-3.

The empirical formulations displayed in Table 4 reference the compressive strength (f'c) of the concrete for predicting flexural strength behavior. As seen in Table 4, the polymer modified mortars do not follow any of the reported empirical relationships. The presence of tough flexible polymer film somewhat uniformly distributed throughout the microstructure increases the ductile behavior of the polymer modified material ultimately leading to deviation from typical concrete behavior.

TABLE 4

Listing of actual experimental flexural strength values along with empirical relationships typically used to describe ordinary portland cement based concrete

| | | p/c = 0.15 | p/c = 0.3 | p/c = 0.45 |
|---|---|---|---|---|
| Flexural Strength Actual | ASTM C348 | 1169 psi (8.06 MPa) | 1406 psi (9.69 MPa) | 1596 psi (11.0 MPa) |
| Flexural Strength Prediction | $f_r = 0.1 \cdot f'c$ | 368 psi (2.54 MPa) | 324 psi (2.23 MPa) | 261 psi (1.8 MPa) |
| Flexural Strength Prediction | $f_r = 0.17 \cdot f'c$ | 626 psi (4.32 MPa) | 551 psi (3.8 MPa) | 444 psi (3.06 MPa) |
| Flexural Strength Prediction | $f_r = 9.5 \cdot (f'c)^{0.5}$ | 577 psi (3.98 MPa) | 541 psi (3.73 MPa) | 485 psi (3.34 MPa) |
| Flexural Strength Prediction | $f_r = 7.5 \cdot (f'c)^{0.5}$ | 455 psi (3.14 MPa) | 427 psi (2.94 MPa) | 383 psi (2.64 MPa) |

FIG. 10 displays compressive strength values for the polymer modified mortars listed in Table 2 after curing for seven days in a sealed plastic bag at ambient laboratory temperature of 23° C. (73° F.). The compressive strength values for mortars possessing polymer/cement ratios of 0.15, 0.3 and 0.45 are 3684 psi (25 MPa), 3239 psi (22 MPa) and 2611 psi (18 MPa), respectively. Statistical software was utilized for data analysis. One-way ANOVA was used to test the equality of the population means for compressive strength testing of polymer modified mortars at polymer/cement ratios of 0.15, 0.3 and 0.45. Results from ANOVA are: $F(2/6)=111.75$, $p=0.000$, pooled standard deviation=0.609 and $R^2=97.39\%$. Based upon the F value of 111.75 and corresponding p-value=0.000, if an alpha value of 0.05 is chosen, it is safe to reject the null hypothesis and ultimately conclude that at least two means differ from one another, and this inequality is highly unlikely due to chance. Further "post hoc" statistical analysis utilizing Tukey's Honestly Significant Difference Test assigned the mortar with p/c=0.15 to "A" compressive strength classification, the mortar with p/c=0.3 to "B" compressive strength classification while the mortar with p/c=0.45 has been assigned to "C" compressive strength classification. For the Tukey comparison method, mortars that do not share the same letter strength classification are significantly different.

Table 5 displays formulation information for a rapid setting hydraulic cement mortar with polymer/cement ratio=1/1. Table 6 displays mechanical property performance information for the formulation displayed in Table 5 after curing for 7 days at ambient laboratory temperature of 23° C. and 50% relative humidity. There is an increase in ductile behavior with increase in polymer content per specific volume of microstructure. One mortar with p/c=0.45 displays 8% elongation; whereas, a mortar with p/c=1/1 displays 21% elongation.

TABLE 5

Mortar formulation by mass with polymer/hydraulic binder ratio 1/1

| | |
|---|---|
| Hydraulic Binding Agent (g) | 500 |
| VAE Polymer Powder ($T_g$ = −7° C.) (g) | 500 |
| Admixtures (g) | 162 |
| Sand (g) | 1500 |
| Water (g) | 300 |

TABLE 6

Mechanical property performance characteristics for mortar formulation displayed in Table 5

| Mechanical Property Performance | Mortar with p/c = 1/1 (3 sample average) |
|---|---|
| ASTM C109 Compressive Strength | 2160 psi (14.9 MPa) |
| ASTM C348 Flexural Strength | 1642 psi (11.3 MPa) |
| ASTM C307 Direct Tensile Strength | 584 psi (4 MPa) |
| % Elongation Direct Tensile Strength (%) | 21.3 |

TABLE 7

Experimental and prophetic mechanical property information for polymer modified cementitious mortars varying polymer/cement ratio holding all other constituents constant

| | p/c = 0.15 | p/c = 0.3 | p/c = 0.45 | p/c = 1/1 | p/c = 2/1 (prophetic) |
|---|---|---|---|---|---|
| Compressive Strength (psi) | 3684 | 3239 | 2611 | 2160 | 1500 |
| Uni-axial direct tensile strength (psi) | 692 | 775 | 719 | 584 | 450 |
| % Elongation | 4 | 6 | 8 | 21 | 33 |
| Modulus of Rupture (psi) | 1169 | 1406 | 1596 | 1642 | 1500 |
| Behavior | brittle | brittle | somewhat brittle | brittle/ elastic | more elastic |

The information displayed in Table 7 further illustrates the influence of polymer/cement ratio on material toughness.

Figure 11:
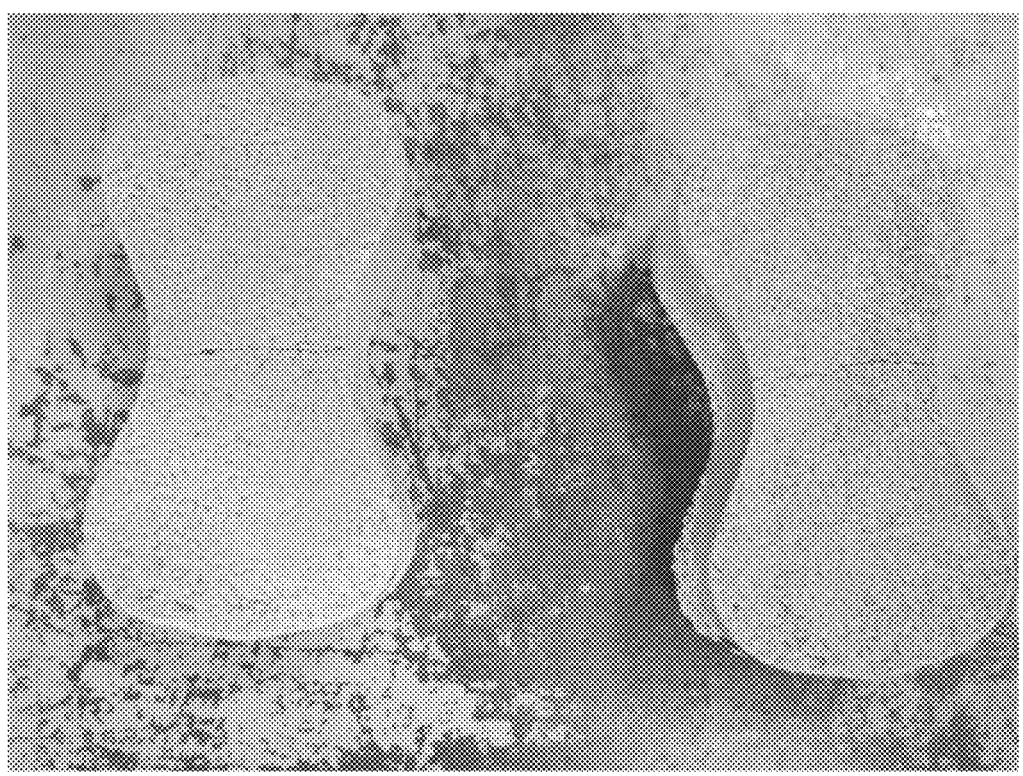
FIG. 11 shows examples of sample specimens for ASTM C307 uni-axial direct tensile strength testing.

In FIG. 11 are examples of sample specimens for ASTM C307 uni-axial direct tensile strength testing. Such samples are colloquially referred to as "dog bone" samples in thee art. For testing, grips were attached to each end via clamps at the neck. A universal testing machine pulled the grips apart along a straight line resulting in a clean break at the neck as pictured in FIG. 11. The % elongation at break is a measure of the distance the grips traveled away from one another as the dog bone sample elongated before reaching its breaking point. For the samples depicted in FIG. 11 as well as those described in Table 8 and FIG. 12, the only variable in formulations was polymer mass. It is important to note that, while strength varied according to the variable polymer mass, strength is less important than % elongation for various materials such as are described herein. That is, % elongation defines elasticity, and elastic materials elongate before breaking, whereas brittle materials suddenly break in violent fashion. Increases in polymer/cement ratio are related to increases in elongation before the point of breaking, i.e., elongation at break. Such information complements the information provided in the stress/strain diagrams obtained per ASTM C307, which detail the exact distance the grips moved away from one another during the process of breaking the dog bone samples. Each time a dog bone is broken, the universal testing machine provides the stress in psi required to break the sample, and the distance the grips traveled as % elongation.

TABLE 8

Polymer modified cement mortar formulations

| | EF6-230BPA | AST2-230 | AST3-250 |
|---|---|---|---|
| Hydraulic Binder (g) | 660 | 660 | 660 |
| Polymer (g) | 100 | 200 | 300 |
| Fine Sand (g) | 1375 | 1375 | 1375 |
| Coarse Sand (g) | 125 | 125 | 125 |
| Admixtures (g) | 5 | 5 | 5 |
| Water (g) | 230 | 230 | 250 |

With respect to the formulations shown in Table 8, it will be noted that polymer mass was the only variable other than water. The polymer/cement ratio increased from EF6-230 BPA to AST3-250 (0.15→0.3→0.45).

Figure 12:
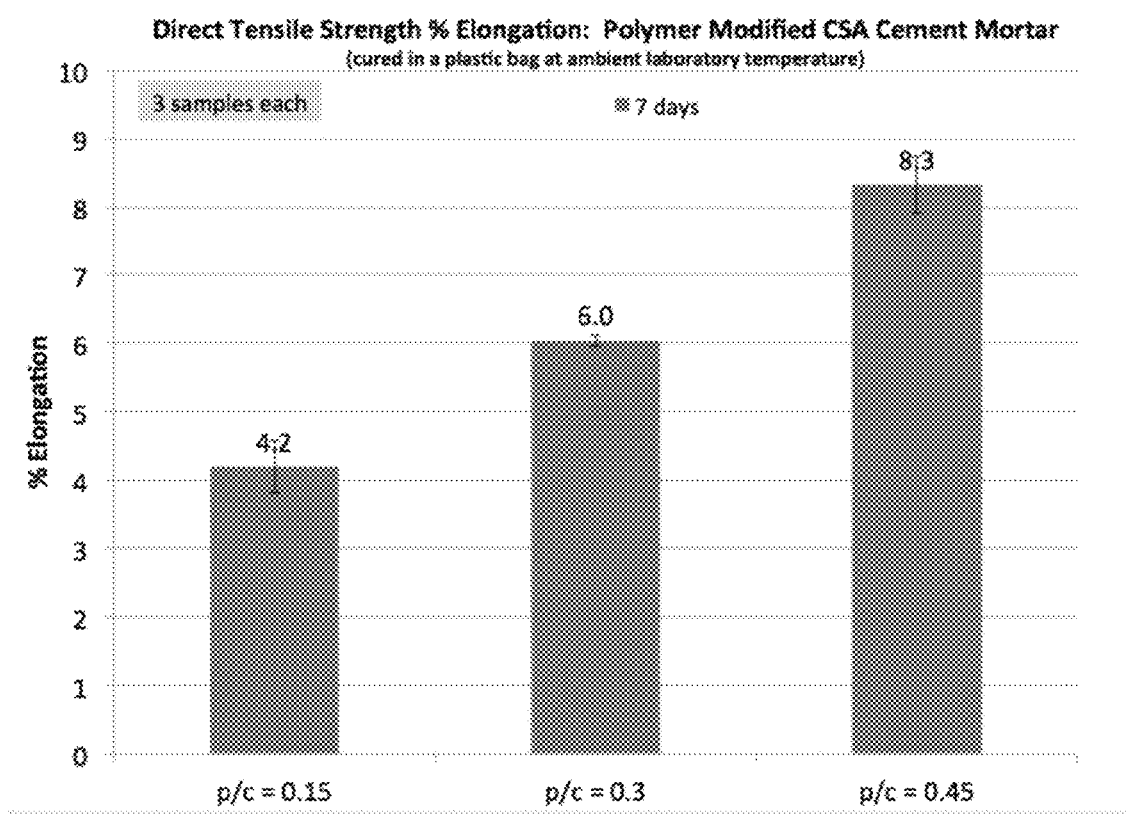
FIG. 12 shows a bar graph depicting percent elongation for broken dog bone samples with only variable being polymer/cement ratio.

Similarly, with respect to formulations whose performance is depicted in FIG. 12, it will be noted that increasing polymer content was the only change in mortar formulations: EF6-230BPA (p/c=0.15), AST2-230 (p/c=0.3) and AST3-250 (p/c=0.45). Increasing polymer/cement ratio was responsible for increased elastic behavior, i.e., increased elongation at break. Increased elongation at break means the sample physically got longer before it broke in the middle of the neck as shown in FIG. 11. The polymer film developed according to a process such as is described herein was observed to be semi-continuous. That is, samples such as those shown in FIG. 11, upon a 24-hour acid etch, retain the original shape of the dog bone. At high polymer/cement ratios, such an acid etch yields a semi-continuous film having essentially the same dimensions as the original sample specimen, yet with a multiplicity of small lacunae.

TABLE 9

Chart listing caliber and ammunition specifications for testing ballistic loading according to UL 752

| Rating | Ammunition | Weight (grains) | Weight (grams) | Min velocity (fps) | Max velocity (fps) | Number of Shots |
|---|---|---|---|---|---|---|
| Level I | 9 mm full metal copper jacket with lead core | 124 | 8 | 1175 | 1293 | 3 |
| Level II | 0.357 Magnum jacketed lead soft point | 158 | 10.2 | 1250 | 1373 | 3 |
| Level III | 0.44 Magnum Lead Semi-Wadcutter gas checked | 240 | 15.6 | 1350 | 1485 | 3 |
| Level IV | 0.30 claiber rifle lead core soft pont (.30-06 caliber) | 180 | 11.7 | 2540 | 2794 | 1 |
| Level V | 7.62 mm rifle lead core full metal copper jacket military ball (0.308 caliber) | 150 | 9.7 | 2750 | 3025 | 1 |
| Level VI | 9 mm full metal copper jacket with lead core | 124 | 8 | 1400 | 1540 | 5 |
| Level VII | 5.56 mm rifle full metal copper jacket with lead core (0.223 caliber) | 55 | 3.56 | 3080 | 3383 | 5 |

TABLE 9-continued

Chart listing caliber and ammunition specifications for testing ballistic loading according to UL 752

| Rating | Ammunition | Weight (grains) | Weight (grams) | Min velocity (fps) | Max velocity (fps) | Number of Shots |
|---|---|---|---|---|---|---|
| Level VIII | 7.62 mm rifle lead core full metal copper jacket military ball (0.308 caliber) | 150 | 9.7 | 2750 | 3025 | 5 |
| Level IX | 0.30-06 caliber rifle, steel core, lead point filler, FMJ (APM2) | 166 | 10.8 | 2715 | 2987 | 1 |
| Level X | 0.50 caliber rifle, lead core FMCJ military ball (M2) | 709.5 | 45.9 | 2810 | 3091 | 1 |
| Shotgun | 12 Gauge rifled lead slug | 1 ounce | 28.3 | 1585 | 1744 | 3 |
| Shotgun | 12 Gauge 00 buckshot (12 pellets) | 1.5 ounces | 42 | 1200 | 1320 | 3 |

Figure 13:
FIG. 13 shows a mortar block with polymer/cement ratio approximately 1/7 after being shot 3 times with 44 Magnum.
Figure 14:
FIG. 14 shows a mortar block with polymer/cement ratio approximately 5/7 after being shot 3 times with 44 Magnum with shots 2 and 3 virtually being on top of one another.
Figure 15:
FIG. 15 shows a mortar block with polymer/cement ratio approximately 7/7 after being shot 3 times with 44 Magnum.

Table 9 displays a listing of specifications related to caliber and ammunition for testing according to UL 752. FIGS. 13, 14 and 15 demonstrate spall behavior of materials such as are described herein with varying polymer/cement ratios when tested with a 44 magnum handgun utilizing 240 grain lead, semi-wad cutter gas checked ammunition. FIGS. 13, 14 and 15 illustrate blocks of approximate dimension 9 in×12 in×4 in constructed with identical mortars varying polymer/cement ratio. FIGS. 13, 14 and 15 display spall behavior of materials with polymer/cement ratios of approximately 1/7, 5/7 and 7/7, respectively when shot with a Smith and Wesson Model 629 Classic 44 Magnum at a distance of approximately 10 ft (3.05 m). FIG. 13 clearly displays impact markings associated with 3 ricochet bullets with minimal spall. FIG. 14 clearly displays the material with polymer/cement ratio of 5/7 absorbing all 3 bullets into the material microstructure while generating minimal spall or structural damage. Shots 2 and 3 were virtually placed on top of one another in FIG. 14. FIG. 15 clearly displays the material with polymer/cement ratio of 7/7 absorbing all 3 bullets into the material microstructure while generating minimal spall or structural damage.

Figure 16:
FIG. 16 shows mortar blocks displayed in FIGS. 13, 14 and 15 after 3 shots with 44 Magnum followed with 5 shots from 223 rifle. From left to right, blocks have a polymer/cement ration of 5/7, 7/7 and 1/7, with a polymer/cement ratio of 1/7 demonstrating complete failure and significant amounts of spall.

FIG. 16 illustrates further testing of the blocks displayed in FIGS. 13, 14 and 15. FIG. 16 illustrates the higher polymer/cement ratio materials generating less spall when shot 5 times with a 0.223 caliber Ruger Ranch Rifle with 55 grain full metal jacket bullets. FIG. 16 illustrates the block with polymer/cement ratio of 1/7 virtually disintegrating after being shot 3 times with a 44 Magnum and subsequently being shot 5 times with a 0.223 rifle. FIG. 16 is of great significance as it demonstrates the ability of the higher polymer/cement ratio materials to absorb significant amounts of energy in comparison to traditional, brittle cementitious materials.

Every reference cited herein is incorporated fully by reference. To the extent that there be any conflict between the teaching of any reference and that of the instant specification, the teaching of the instant specification shall control.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A process for making an essentially shaped cementitious product wherein a 51-mm-thick sample of the product halts a full metal jacket bullet fired into the sample's thickness from a 9 mm handgun at a distance of 15 meters and wherein spallation resulting from entry of the bullet into the thickness occurs in a zone on the entry surface not greater than about 50 times the cross-sectional area of a hole resulting from the bullet's entry into the thickness, the process consisting of:
   (a) admixing a liquid medium, wherein the liquid medium comprises water, a hydraulic binding agent, wherein the hydraulic binding agent comprises a cement, a latex polymer, wherein the latex polymer comprises a copolymer of vinyl acetate and ethylene, and optionally one or more other components, wherein the mass ratio of the latex polymer to the hydraulic binding agent is between about 5:7 and about 2:1, to form a mixture;
   (b) placing the mixture in an essentially prismatic disposition wherein the mixture sets, thereby forming a set essentially shaped mixture; and
   (c) permitting, at ambient temperature, the set essentially shaped mixture to harden, thereby forming the essentially shaped cementitious product wherein a 51-mm-thick sample of the product halts a full metal jacket bullet fired into the sample's thickness from a 9 mm handgun at a distance of 15 meters and wherein spallation resulting from entry of the bullet into the thickness occurs in a zone on the entry surface not greater than about 50 times the cross-sectional area of a hole resulting from the bullet's entry into the thickness.

2. A process for making an essentially shaped cementitious product wherein the direct tensile strength of the product as determined by ASTM C307 after curing for 7 days at ambient temperature of 23° C. and relative humidity less than 85% is at least 120% of a predicted direct tensile strength of the product per an equation selected from the group consisting of f'dt=0.06*f'c, f'dt=0.07*f'c, f'dt=0.08*f'c and f'dt=0.11*f'c, the process consisting of:
   (a) admixing a liquid medium, wherein the liquid medium comprises water, a hydraulic binding agent, wherein the hydraulic binding agent comprises a cement, a latex polymer, wherein the latex polymer comprises a copolymer of vinyl acetate and ethylene, and optionally one or more other components, wherein the mass ratio of the latex polymer to the hydraulic binding agent is between about 5:7 and about 2:1, to form a mixture;
   (b) placing the mixture in an essentially prismatic disposition wherein the mixture sets, thereby forming a set essentially shaped mixture; and
   (c) permitting, at ambient temperature, the set essentially shaped mixture to harden, thereby forming the essentially shaped cementitious product wherein the direct tensile strength of the product as determined by ASTM C307 after curing for 7 days at ambient laboratory temperature of 23° C. and relative humidity less than 85% is at least 120% of a predicted direct tensile strength of the product per an equation selected from the group consisting of f'dt=0.06*f'c, f'dt=0.07*f'c, f'dt=0.08*f'c and f'dt=0.11*f'c.

3. A process for making an essentially shaped cementitious product wherein the flexural strength of the product as determined by ASTM C348 is at least 150% of a predicted flexural strength of the product per an equation selected from the group consisting of $f'r=0.1*f'c$, $f'r=0.17*f'c$, $f'r=9.5*((f'c)^0.5)$ and $f'r=7.5*((f'c)^0.5)$, the process consisting of:
  (a) admixing a liquid medium, wherein the liquid medium comprises water, a hydraulic binding agent, wherein the hydraulic binding agent comprises a cement, a latex polymer, wherein the latex polymer comprises a copolymer of vinyl acetate and ethylene, and optionally one or more other components, wherein the mass ratio of the latex polymer to the hydraulic binding agent is between about 5:7 and about 2:1, to form a mixture;
  (b) placing the mixture in an essentially prismatic disposition wherein the mixture sets, thereby forming a set essentially shaped mixture; and
  (c) permitting, at ambient temperature, the set essentially shaped mixture to harden, thereby forming the essentially shaped cementitious product wherein the flexural strength of the product as determined by ASTM C348 is at least 150% of a predicted flexural strength of the product per an equation selected from the group consisting of $f'r=0.1*f'c$, $f'r=0.17*f'c$, $f'r=9.5*((f'c)^0.5)$ and $f'r=7.5*((f'c)^0.5)$.

4. The process of claim 1, wherein the mass ratio of the latex polymer to the hydraulic binding agent is about 5:7.

5. The process of claim 1, wherein the mass ratio of the latex polymer to the hydraulic binding agent is about 1:1.

6. The process of claim 1, wherein the mass ratio of the latex polymer to the hydraulic binding agent is about 2:1.

7. The process of claim 5, wherein the latex polymer is in a form of polymer solids.

8. The process of claim 6, wherein the latex polymer is in a form of polymer solids.

9. The process of claim 2, wherein the mass ratio of the latex polymer to the hydraulic binding agent is about 5:7.

10. The process of claim 2, wherein the mass ratio of the latex polymer to the hydraulic binding agent is about 1:1.

11. The process of claim 2, wherein the mass ratio of the latex polymer to the hydraulic binding agent is about 2:1.

12. The process of claim 10, wherein the latex polymer is in a form of polymer solids.

13. The process of claim 11, wherein the latex polymer is in a form of polymer solids.

14. The process of claim 3, wherein the mass ratio of the latex polymer to the hydraulic binding agent is about 5:7.

15. The process of claim 3, wherein the mass ratio of the latex polymer to the hydraulic binding agent is about 1:1.

16. The process of claim 3, wherein the mass ratio of the latex polymer to the hydraulic binding agent is about 2:1.

17. The process of claim 15, wherein the latex polymer is in a form of polymer solids.

18. The process of claim 16, wherein the latex polymer is in a form of polymer solids.

* * * * *